Patented Feb. 21, 1950

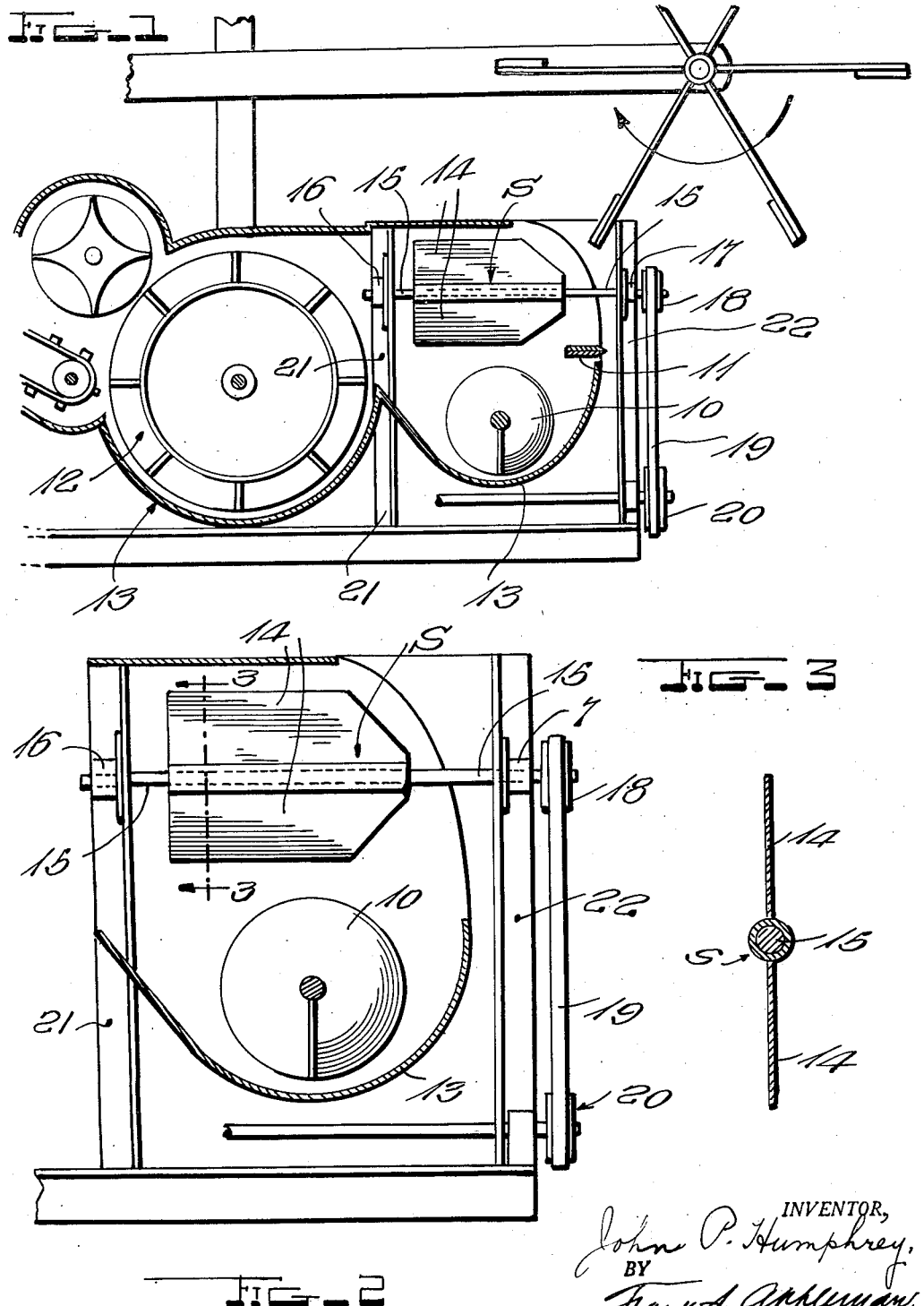

2,498,424

UNITED STATES PATENT OFFICE 2,498,424

DOWN-BEATER FOR COMBINES

John P. Humphrey, Kiowa, Kans.

Application February 4, 1947, Serial No. 726,392

2 Claims. (Cl. 56—122)

This invention relates in general to combines, and more particularly to downbeaters for use in certain types of combines.

My invention may be utilized as an attachment for existing types of combines and will greatly aid in the combining and threshing of various types of grains and cereals.

It is an object of my invention to provide a downbeater for use in a combine that will prevent downy and fluffy grain or cereal from being lodged against the feeder housing.

Another object of my invention is to provide a rotary downbeater that will aid in feeding grain or cereal from the feeder housing to the threshing cylinder of a combine.

Still another object of my invention is to provide a bladed rotary downbeater for use in combines between the feed conveyor and threshing cylinder.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a fragmentary sectional view of the forward end of a combine showing the relative location of the downbeater to the feed conveyor and threshing cylinder;

Figure 2 illustrates a vertical section through the spiral conveyor of Figure 1 showing the details of the beater in enlarged scale and its relation to the spiral conveyor; and Figure 3 illustrates a detail vertical transverse section of the beater taken along the plane 3—3 of Figure 2.

Although my invention is to be described as being utilized with a particular type of combine, known as the "gleaner" combine, my device may well be adapted for use with other combines without departing from the spirit of my invention.

The downbeater is a device to aid in the combining and threshing of grain or cereal. In combines utilizing the auger type of conveyor, such as the gleaner combine, my device is placed above the auger conveyor where the grain is being fed into the threshing cylinder.

Referring to Figure 1, there is shown a portion of a conventional combine to which is added my invention. The reference numeral 10 refers to a spiral conveyor which is utilized to feed the grain cut by a sickle 11 to a threshing cylinder 12. A housing 13 encloses the end of the spiral conveyor 10 and the threshing cylinder 12.

Mounted within the housing 13 is a rotary beater having a pair of trapezoidal flat blades 14, 14 which are mounted by welding or other means to a hollow shaft S. The beater is mounted in a horizontal position substantially directly over the spiral conveyor 10 and spaced a short distance therefrom as seen in Figure 2. The beater is mounted upon a substantially horizontal shaft 15 which extends through the hollow shaft S. Although the beater is described and illustrated as having two blades 14, 14 a greater number of blades may be utilized if so desired.

The inner end of the beater shaft 15 is mounted in a housing 16 having a self-alining bearing. The outer end of the beater shaft passes through a housing 17 having a self-alining bearing to a pulley 18 which is connected by a belt 19 to a power pulley 20. The power pulley 20 may be mounted on the power take-off shaft of the combine or power may be supplied in any other suitable manner.

The housing 16 is securely mounted upon a rear vertical standard 21, while the housing 17 is likewise mounted upon a standard 22 to the front of the member 21, the members 21 and 22 being present in a conventional combine of the type mentioned.

It often happens that the condition of the grain when cut is such that it will fluff or otherwise bunch up and not feed in a proper manner to the threshing cylinder. By utilizing a rotary beater of the type just described, it is possible to prevent such occurrences and assure continuous transfer of the grain from the spiral conveyor to the threshing cylinder.

While the invention has been described in some detail, the description is merely illustrative and not restrictive. It is understood that changes and modifications may be made without departing from the spirit of the invention.

I claim:

1. In a combine of the type having a sickle, a threshing cylinder having an entrance opening, and a conveyor for moving the cut grain from the sickle through the entrance opening into the threshing cylinder, the improvement comprising a rotary bladed beater located above the conveyor adjacent to the entrance opening of the threshing cylinder, the axis of the rotary beater being at right angles to the axis of the conveyor so that the cut grain will be beat down, thereby enabling the conveyor to move the grain to the threshing machine.

2. In a combine of the type having a sickle, a threshing cylinder having an entrance opening, and a conveyor in parallel relationship to the threshing cylinder for moving the cut grain from the sickle through the entrance opening into the threshing cylinder, the improvement comprising a rotary bladed beater located above the conveyor adjacent the entrance opening of the threshing cylinder, the longitudinal axis of the rotary beater being at right angles to the axis of the conveyor and threshing cylinder so that the cut grain will be beat down, thereby enabling the conveyor to move the grain to the threshing cylinder.

JOHN P. HUMPHREY.

REFERENCES CITED

The following references are of record in the file of this patent:

UNITED STATES PATENTS

| Number | Name | Date |
| --- | --- | --- |
| Re. 21,161 | Korsmo et al. | July 25, 1939 |
| 1,168,932 | Bullock et al. | Jan. 18, 1916 |
| 1,994,298 | Anderson | Mar. 12, 1935 |